United States Patent [19]

Teraji et al.

[11] Patent Number: 4,650,522

[45] Date of Patent: Mar. 17, 1987

[54] CONCRETE ADMIXTURE

[75] Inventors: Tsutomu Teraji, Osaka; Kazushige Kawada, Takarazuka; Toru Takeuchi, Sakura; Shinichi Sugita, Osaka; Toshikazu Adachi, Ibaragi; Hideo Yaqi, Sakura, all of Japan

[73] Assignee: Fujisawa Pharmaceutical Co., Ltd., Osaka, Japan

[21] Appl. No.: 775,390

[22] Filed: Sep. 12, 1985

[30] Foreign Application Priority Data

Sep. 12, 1984 [GB] United Kingdom ............... 8423054

[51] Int. Cl.$^4$ ................................................ C04B 7/35
[52] U.S. Cl. ....................................... 106/314; 106/90; 166/293; 524/3; 524/5
[58] Field of Search ..................... 106/90, 314, 315; 166/293; 524/3, 5

[56] References Cited

U.S. PATENT DOCUMENTS

| 3,491,049 | 1/1970 | Gibson et al. | 106/90 |
| 4,401,472 | 8/1983 | Gerber | 106/314 |
| 4,413,681 | 11/1983 | McKenzie | 106/90 |
| 4,482,383 | 11/1984 | McKenzie | 106/90 |

FOREIGN PATENT DOCUMENTS

| 50-14661 | 5/1975 | Japan . | |
| 56-120559 | 9/1981 | Japan | 106/90 |
| 57-109885 | 7/1982 | Japan . | |
| WO83/02938 | 9/1983 | PCT Int'l Appl. . | |
| 767050 | 10/1980 | U.S.S.R. | 106/90 |

Primary Examiner—William R. Dixon, Jr.
Assistant Examiner—Steven Capella
Attorney, Agent, or Firm—Oblon, Fisher, Spivak, McClelland & Maier

[57] ABSTRACT

The invention relates to a concrete admixture comprising a polyethyleneimine compound for incorporation into a cementing composition.

8 Claims, No Drawings

CONCRETE ADMIXTURE

The present invention relates to concrete admixture for incorporation in cementing composition, for example, concrete mix, mortar, cement paste and the like.

More particularly, it relates to concrete admixture which comprises polyethyleneimine compounds mentioned below, which improve the flow properties of the cementing composition, especially facilitating high flow rates of the cementing composition when they are being pumped to its desired location during the cementing operation and which prevent the change of the consistency to a stiffer one with time, such as slump loss in concrete.

Said polyethyleneimine compounds are those having polysubstituents in which said substituents are selected from the group consisting of (1) acidic group, acidic group(s) substituted-alkyl or acidic group(s) substituted-acyl and (2) acidic group(s) substituted-alkyl and a group selected from the group consisting of carbamoylalkyl and hydroxyalkyl, namely, polyethyleneimine compounds of the invention are selected from the compound consisting of (1) poly[acidic group(s) and/or acidic group(s) substituted-alkyl group(s) and/or acidic group(s) substituted-acyl group(s)]polyethyleneimine and (2) poly[acidic group(s) substituted-alkyl and a group selected from the group consisting of carbamoylalkyl and hydroxyalkyl]polyethyleneimine.

More particularly, polyethyleneimine compounds are those having polysubstituents in which said substituents are selected from the group consisting of (1) acidic group,
(2) acidic group(s) substituted-alkyl,
(3) acidic group(s) substituted-acyl,
(4) acidic group(s) substituted-alkyl and hydroxyalkyl and
(5) acidic group(s) substituted-alkyl and carbamoylalkyl, namely, polyethyleneimine compounds of the present invention are selected from the compound consisting of (1) poly(acidic group)polyethyleneimine,
(2) poly[acidic group(s) substituted-alkyl group(s)]polyethyleneimine,
(3) poly[acidic group(s) substituted-acyl]polyethyleneimine,
(4) poly[acidic group(s) substituted-alkyl and hydroxyalkyl]polyethyleneimine and
(5) poly[acidic group(s) substituted-alkyl and carbamoylalkyl]polyethyleneimine.

These compounds (1) to (5) are hereinafter referred to as "polyethyleneimine compounds".

The alkyl group in the term "acidic group(s) substituted-alkyl" in the above polyethyleneimine compounds may be further substituted with suitable substituent(s).

In addition to the characteristics as mentioned above, since the polyethyleneimine compounds of the present invention reduce apparently the viscosity of a cementing composition to which they are added, it is possible to reduce the unit water content of cementing composition, thus obtaining greater compressive strengths in the concrete as obtained.

Up to now, although various kinds of concrete admixture are known in the art, they are insufficient in improvement of the flow properties of the cementing composition and in prevention of the change of the consistency with time.

The inventors of the present invention conducted the research work to find out more preferable concrete admixture which possesses the improved characteristics in the flow properties and prevention of the change of the consistency of cementing composition, and have completed the present invention.

In the above and subsequent descriptions of the present specification, the various definitions which the present invention intends to include within the scope thereof are explained in detail as follows.

The term "lower" is used to intend a group having 1 to 6 carbon atom(s), unless otherwise provided.

Suitable acidic group and acidic group moiety in the terms "acidic group(s) substituted-alkyl" and "acidic group(s) substituted-acyl" may include carboxy, salt thereof, cyano, and the like.

The acidic group as substituent on alkyl or acyl group may be more than one, wherein the acidic groups may be the same or different.

Suitable salt of carboxy may include salt with base, for example, inorganic salt such as alkali metal salt (e.g., sodium salt, potassium salt, etc.), alkaline earth metal salt (e.g., calcium salt, magnesium salt, etc.) or the like.

Suitable alkyl moiety in the terms "acidic group(s) substituted-alkyl", "carbamoylalkyl" and "hydroxyalkyl" may include lower alkyl and higher alkyl.

Suitable lower alkyl may be the ones having 1 to 6 carbon atom(s), which may be branched and may include methyl, ethyl, propyl, isopropyl, butyl, isobutyl, t-butyl, pentyl, hexyl and the like.

Suitable higher alkyl may be the ones having 7 to 16 carbon atoms, which may be branched and may include heptyl, octyl, nonyl, decyl, undecyl, dodecyl, tridecyl, tetradecyl, pentadecyl, hexadecyl and the like.

Suitable acyl moiety in the term "acidic group(s) substituted-acyl" may be aliphatic acyl, aromatic acyl and the like and may include lower alkanoyl (e.g., formyl, acetyl, propionyl, butyryl, isobutyryl, valeryl, isovaleryl, pivaloyl, etc.), aroyl (e.g., benzoyl, toluoyl, etc.) and the like.

The substituent(s) on the alkyl group in the term "acidic group(s) substituted-alkyl" may be hydroxy or the like.

Preferred examples of the polyethyleneimine compounds of this invention may be (1) poly[dialkali metal dicarboxylatoalkyl(more preferably disodium dicarboxylato(lower)alkyl]-polyethyleneimine, (2) poly[dicarboxyalkyl(more preferably dicarboxy(lower)alkyl)]polyethyleneimine, (3) poly[alkali metal or alkaline earth metal carboxylatoalkyl(more preferably sodium or calcium carboxylato(lower)alkyl, or sodium carboxylato(higher)alkyl)]polyethyleneimine, (4) poly[alkali metal carboxylatoalkyl(more preferably sodium carboxylato(lower)alkyl)]-poly[cyanoalkyl(more preferably cyano(lower)alkyl)]polyethyleneimine, (5) poly[carboxyalkyl(more preferably carboxy(lower)alkyl)]polyethyleneimine, (6) poly[dialkali metal dicarboxylatohydroxyalkyl(more preferably disodium dicarboxylatohydroxy(lower)alkyl)]polyethyleneimine, (7) poly[alkali metal carboxylatoaroyl(more preferably sodium carboxylatobenzoyl)]polyethyleneimine, (8) poly[carboxyalkyl(more preferably carboxy(lower)alkyl)]-poly[hydroxyalkyl(more preferably hydroxy(lower)alkyl)]polyethyleneimine, (9) poly[carboxyalkyl(more preferably carboxy(lower)alkyl)]-poly[cyanoalkyl(more preferably cyano(lower)alkyl)]polyethyleneimine,

(10) poly[carboxyalkyl(more preferably carboxy(lower)alkyl) or dicarboxyalkyl(more preferably dicarboxy(lower)alkyl)]-poly[carbamoylalkyl(more preferably carbamoyl(lower)alkyl)]polyethyleneimine and

(11) poly[alkali metal carboxylatoalkyl(more preferably sodium carboxylato(lower)alkyl)]-poly[hydroxyalkyl(more preferably hydroxy(lower)alkyl)]polyethyleneimine.

The introduction rate of the said substituents on polyethyleneimine is not critical and preferable rate may vary depending on some factors, e.g., kind of the substituent, molecular weight of the starting polyethyleneimine, etc.

Molecular weight of the polyethyleneimine used as starting compound for the preparation of the object polyethyleneimine compounds is not critical and may be 200 to 100,000, preferablely 5,000 to 20,000.

The starting polyethyleneimine are known compounds and it is well known to a person skilled in the art that they include primary, secondary and tertiary amines.

The object polyethyleneimine compounds can be prepared by reacting polyethyleneimine with conventional introducing agents of the desired substituents in a conventional manner, and if necessary by subjecting the resultant to hydrolysis, etc.

Now, in order to show the utility of the polyethyleneimine compounds of the present invention, with regard to some representative compounds of this invention, the test data on mortar flow and concrete are shown in the following.

Test 1 Mortar flow test (1) Test Method

Consistency was measured by mortar flow test, and flow values of the mortars containing the test compounds were compared with that of the same mortar containing no additive.

The procedure utilized in the mortar flow test was the basic procedure described in the Japan Industrial Standard (JIS) R 5201, which includes similar sections to ASTM C 109-83, C 230-83 and C 305-83.

Materials and the mortar composition utilized in the test are 520 g of ordinary Portland cement specified in JIS R 5210, 1040 g of graded Toyoura standard sand and 364 ml of water or the aqueous solution containing 1.1 g of the test compound.

The mortars were made by mechanical mixing of ingredients, and flow values were determined in accordance with JIS R 5201. A flow cone (ASTM C 230-83) on a flow table was packed with the fresh mortar prepared in a mixing bowl. After the flow cone was lifted off vertically, diameter of the extended mortar mass on the table was measured four times at approximately equispaced intervals. The flow value of the fresh mortar was expressed as an average diameter (mm) of the mortar mass.

After measurement of the flow, the mortar was recovered from the flow table to the mixing bowl, allowed to stand for 60 minutes and then remixed for 60 seconds in the bowl. The flow value was measured again for the determination of flow loss, as described above.

(2) Test Results

The test results are given in Table 1.

TABLE 1

| Test compounds (Example Nos.) | Flow (mm) | |
|---|---|---|
| | 0 min. | 60 min. |
| 1 | 209 | 172 |
| 2 | 205 | 197 |
| 3 | 220 | 212 |
| 4 | 191 | 187 |
| 5 | 221 | 213 |
| 6 | 229 | 179 |
| 7 | 223 | 215 |
| 8 | 195 | 167 |
| 9 | 194 | 185 |
| 10 | 196 | 182 |
| 11 | 211 | 147 |
| 12 | 208 | 197 |
| 13 | 192 | 208 |
| 14 | 224 | 175 |
| 15 | 222 | 196 |
| 16 | 211 | 195 |
| 17 | 220 | 201 |
| 18 | 200 | 193 |
| 19 | 224 | 205 |
| 20 | 222 | 215 |
| 21 | 207 | 210 |
| 22 | 228 | 170 |
| 23 | 218 | 199 |
| 24 | 209 | 196 |
| 25 | 202 | 183 |
| 26 | 216 | 198 |
| 27 | 229 | 222 |
| 28 | 215 | 182 |
| 29 | 200 | 190 |
| 30 | 209 | 203 |
| 31 | 214 | 216 |
| 32 | 218 | 193 |
| 33 | 205 | 209 |
| 34 | 218 | 204 |
| 35 | 219 | 199 |
| 36 | 214 | 227 |
| 37 | 232 | 185 |
| 38 | 213 | 222 |
| 39 | 219 | 181 |
| 40 | 223 | 225 |
| 41 | 216 | 173 |
| 42 | 208 | 195 |
| 43 | 219 | 180 |
| 44 | 204 | 185 |
| 45 | 224 | 214 |
| 46 | 208 | 170 |
| 47 | 221 | 184 |
| 48 | 206 | 204 |
| 49 | 214 | 203 |
| 50 | 216 | 197 |
| 51 | 209 | 176 |
| Reference (non-additive) | 169 | 144 |

Test 2 Concrete test (1) Test Method

Consistency of the concrete containing test compounds were compared with that of the plain concrete (non-additive), and slump loss (the time-dependent change of consistency) of the concrete was compared with that of the reference concrete adjusted to the same initial slump by increasing unit water. The method utilized in the test was the basic procedure described in the Japan Industrial Standard (JIS) A 6204 for chemical admixtures for concrete and Guidelines of Architectural Institute of Japan for the use of superplasticizers in concrete.

Materials utilized in the test were as follows:

Cement: a mixture of ordinary Portland cements specified in JIS R 5210 from three different manufacturers.

Aggregates: sand from Fuji river and crushed stone from Kasama. Both were graded by following the standard specification in JIS A 6204.

Mix proportion of concrete is shown in Table 2.

The concrete was prepared by mixing cement, aggregates and water or water containing a test compound in a tilting mixer for 3 minutes on a scale of 30 liters, and was allowed to stand in a mixing pan.

Initial slump and the time-dependent change of slump (at every 20 minutes intervals to 1 hour) were measured after remixing in the mixing pan.

(2) Test Results

The results are given in Table 3.

TABLE 2

| Concrete | Water-cement ratio (%) | s/a (%) | Unit weight (kg/m³) | | | |
|---|---|---|---|---|---|---|
| | | | W | C | S | G |
| Plain and test concrete | 56.9 | 49 | 182 | 320 | 911 | 962 |
| Reference concrete | 63.8 | 49 | 204 | 320 | 882 | 932 |

W: water, C: cement, S: sand, G: gravel
s/a: ratio of sand to aggregates (aggregates contain sand and gravel)

TABLE 3

| Concrete | Dosage of the test compounds [% (w/w) of cement] | Air content (%) | Slump (cm) | | | |
|---|---|---|---|---|---|---|
| | | | 0 | 20 | 40 | 60 minutes |
| Plain concrete | — | 1.8 | 8.0 | 7.0 | 6.5 | 5.0 |
| Test concrete containing | | | | | | |
| a compound of Example 2 | 0.52 | 1.5 | 20.5 | 21.0 | 19.5 | 19.0 |
| a compound of Example 3 | 0.52 | 1.6 | 19.5 | 21.0 | 19.5 | 19.0 |
| a compound of Example 7 | 0.52 | 2.0 | 16.5 | 18.0 | 17.5 | 18.5 |
| a compound of Example 17 | 0.52 | 0.7 | 20.5 | 19.0 | 19.5 | 19.0 |
| a compound of Example 26 | 0.52 | 2.4 | 19.5 | 19.5 | 19.0 | 19.0 |
| a compound of Example 27 | 0.52 | 4.0 | 20.0 | 20.0 | 19.5 | 19.5 |
| a compound of Example 40 | 0.52 | 2.6 | 17.0 | 16.5 | 16.0 | 17.0 |
| a compound of Example 50 | 0.52 | 2.4 | 16.0 | 15.5 | 15.5 | 17.0 |
| Reference concrete | — | 1.6 | 17.0 | 16.0 | 15.0 | 13.5 |

As clear from the test results as stated above, the polyethyleneimine compounds of the present invention improve the flow properties of the cementing composition (cf. high initial flow value) and prevent the slump loss in concrete as compared with the reference (non-additive).

It might be clear from the test results shown in Table 3 that the polyethyleneimine compounds much reduced unit water content without air-entraining.

Suitable dosage of the polyethyleneimine compounds of this invention to cementing composition may amount to 0.01–1.0% of cement, more preferably 0.1–0.6% of cement.

The following Examples are given for the purpose of illustrating the preparation of the polyethyleneimine compounds of the present invention.

The starting polyethyleneimine used in the following Examples are commercially available.

EXAMPLE 1

To a solution of polyethyleneimine (hereinafter referred to as "PEI"[average molecular weight (hereinafter referred to as "molecular weight"): 10,000] (43.0 g) in water (130 ml) was added dropwise maleic acid [Prepared from maleic anhydride (24.5 g) and water (29.0 g) (¼ molar equivalent, a molar equivalent corresponds to one unit molecule of PEI) in water (37.5 ml)] at 25°–40° C. with stirring and the mixture was stirred for 2 hours at room temperature. Sodium hydroxide (20.0 g) in water (100 ml) was added to the aqueous solution with stirring, and the mixture was stirred for 18 hours under reflux to give an aqueous solution of poly(disodium 1,2-dicarboxylatoethyl)polyethyleneimine (83.0 g). The introduction rate of the acidic substituent (disodium 1,2-dicarboxylatoethyl) was calculated from amine and acid normalities determined by colloidal titration method described in "Colloidal Titaration Method" (published by Nankodo, 1969) and Kobunshi Ronbunshu 33, No. 6, 309–316(1976) to show 11.2%. (Hereinafter, the same colloidal titration method was applied to determine the introduction rate of the acidic substituent as introduced.).

EXAMPLE 2

To a solution of polyethyleneimine (molecular weight: 10,000) (32.1 g) in water (28 ml) was added dropwise maleic acid (7.2 g) (1/12 molar equivalent) in water (10.9 ml) [prepared from maleic anhydride (6.1 g) and water] at 30°–50° C. with stirring. The mixture was stirred for 10 hours under reflux to give an aqueous solution of poly(1,2-dicarboxyethyl)polyethyleneimine (39.3 g). The introduction rate of the acidic substituent was 7.2%.

EXAMPLE 3

To a solution of PEI (molecular weight: 10,000) (57.2 g) in water (78.8 ml) was added portionwise itaconic acid (21.6 g) (1/8 molar equivalent) at 25° to 40° C. with stirring. The mixture was stirred for 11 hours under reflux to give an aqueous solution of poly(2,3-dicarboxypropyl)polyethyleneimine (78.8 g). The introduction rate of the acidic substituent was 8.2%.

EXAMPLE 4

Poly(2,3-dicarboxypropyl)polyethyleneimine was prepared by reacting PEI(molecular weight: 10,000) with 1/16 molar equivalent of itaconic acid according to a similar manner to that of Example 3.

EXAMPLE 5

To a solution of PEI (molecular weight: 10,000) (62.0 g) in water (139 ml) was added dropwise acrylonitrile (19.1 g) (¼ molar equivalent) at 28°–40° C. with stirring. The mixture was stirred for 1.25 hours at room temperature. Sodium hydroxide (14.4 g) in water (139 ml) was added to the reaction product, and the mixture was refluxed for 1 hour with stirring followed by removal of ammonia under reduced pressure at 45°–50° C. to give an aqueous solution of poly(sodium 2-carboxylatoethyl)-polyethyleneimine(95.9 g). The introduction rate of the acidic substituent was 22.1%.

EXAMPLE 6

Poly(sodium 2-carboxylatoethyl)polyethyleneimine was prepared by reacting PEI(molecular weight: 10,000) with ⅓ molar equivalent of acrylonitrile according to a similar manner to that of Example 5. The introduction rate of the acidic substituent was 33.1%.

EXAMPLE 7

Poly(sodium 2-carboxylatoethyl)polyethyleneimine was prepared by reacting PEI(molecular weight: 10,000) with 1/5 molar equivalent of acrylonitrile according to a similar manner to that of Example 5. The introduction rate of the acidic substituent was 18.7%.

EXAMPLE 8

Poly(sodium 2-carboxylatoethyl)polyethyleneimine was prepared by reacting PEI(molecular weight: 600) with ¼ molar equivalent of acrylonitrile according to a similar manner to that of Example 5.

EXAMPLE 9

Poly(sodium 2-carboxylatoethyl)polyethyleneimine was prepared by reacting PEI(molecular weight 1,800) with ½ molar equivalent of acrylonitrile according to a similar manner to that of Example 5. The introduction rate of the acidic substituent was 46.1%.

EXAMPLE 10

Poly(sodium 2-carboxylatoethyl)polyethyleneimine was prepared by reacting PEI(molecular weight 1,800) with ⅓ molar equivalent of acrylonitrile according to a similar manner to that of Example 5. The introduction rate of the acidic substituent was 30.0%.

EXAMPLE 11

Poly(sodium 2-carboxylatoethyl)polyethyleneimine was prepared by reacting PEI(molecular weight: 10,000) with ½ molar equivalent of acrylonitrile according to a similar manner to that of Example 5. The introduction rate of the acidic substituent was 50.2%.

EXAMPLE 12

Poly(sodium 2-carboxylatoethyl)polyethyleneimine was prepared by reacting PEI(molecular weight: from 60,000 to 80,000) with ¼ molar equivalent of acrylonitrile according to a similar manner to that of Example 5. The introduction rate of the acidic substituent was 24.1%.

EXAMPLE 13

Poly(sodium 2-carboxylatoethyl)polyethyleneimine was prepared by reacting PEI(molecular weight: from 60,000 to 80,000) with 1/5 molar equivalent of acrylonitrile according to a similar manner to that of Example 5. The introduction rate of the acidic substituent was 20.5%.

EXAMPLE 14

Poly(sodium 2-carboxylatoethyl)polyethyleneimine was prepared by reacting PEI(molecular weight: from 60,000 to 80,000) with ⅓ molar equivalent of acrylonitrile according to a similar manner to that of Example 5. The introduction rate of the acidic substituent was 33.0%.

EXAMPLE 15

To a solution of PEI(molecular weight: 10,000) (50.0 g) in water (112 ml) was added dropwise (61.7 g) acrylonitrile (1 molar equivalent) at 30°–40° C. with stirring. The mixture was stirred for 1 hour at room temperature and for 2 hours at 80° C. To the reaction product was added sodium hydroxide (¼ molar equivalent) (11.2 g) in water (112 ml) and the mixture was refluxed for 42 hours with stirring to give an aqueous solution of poly(sodium 2-carboxylatoethyl)poly(2-cyanoethyl)polyethyleneimine (123.5 g). The introduction rate of the acidic substituent was 30.1%.

EXAMPLE 16

Poly(sodium 2-carboxylatoethyl)poly(2-cyanoethyl)-polyethyleneimine was prepared by reacting PEI (molecular weight: 10,000) with 1 molar equivalent of acrylonitrile and ⅓ molar equivalent sodium hydroxide according to a similar manner to that of Example 15. The introduction rate of the acidic substituent was 22.3%.

EXAMPLE 17

To a solution of polyethyleneimine(molecular weight: 10,000) (82.5 g) in water (270 ml) was dropped acrylic acid (34.6 g) at 30°–40° C. under stirring, which was continued for 3 hours at 80° C. to give an aqueous solution of poly(2-carboxyethyl)polyethyleneimine (117.1 g). The introduction rate of the acidic substituent was 22.4%.

EXAMPLE 18

Poly(2-carboxyethyl)polyethyleneimine was prepared starting from PEI(molecular weight: 10,000) with 1/10 molar equivalent of acrylic acid according to a similar manner to that of Example 17. The introduction rate of the acidic substituent was 10.6%.

EXAMPLE 19

To a solution of PEI(molecular weight: 10,000) (32.5 g) in water (84.5 ml) was added dropwise methacrylic acid (13.0 g) (1/5 molar equivalent) at 25°–40° C. with stirring. The mixture was stirred for 3 days under reflux to give an aqueous solution of poly(2-carboxypropyl)-polyethyleneimine (45.5 g). The introduction rate of the acidic substituent was 17.7%.

EXAMPLE 20

Poly(2-carboxyethyl)polyethyleneimine was prepared by reacting PEI(molecular weight: 10,000) with 1/5 molar equivalent acrylic acid according to a similar manner to that of Example 17. The introduction rate of the acidic substituent was 17.9%.

EXAMPLE 21

Poly(2-carboxyethyl)polyethyleneimine was prepared by reacting PEI (molecular weight: 5,000) with 2/9 molar equivalent of acrylic acid according to a similar manner to that of Example 17. The introduction rate of the acidic substituent was 22.2%.

EXAMPLE 22

To a solution of PEI(molecular weight: 10,000) (60.6 g) in water (85 ml) was added portionwise disodium epoxysuccinate (13.5 g) (1/16 molar equivalent) at room temperature with stirring, and the mixture was stirred for 3 hours at room temperature and for 5 hours at 50° C. to give an aqueous solution of poly(disodium 1,2-dicarboxylato-2-hydroxyethyl)-polyethyleneimine (74.1 g). The introduction rate of the acidic substituent was 5.5%.

EXAMPLE 23

To a solution of PEI(molecular weight: 10,000) (43.1 g) in water (70 ml) was added dropwise acrylamide (17.8 g) (¼ molar equivalent) in water (80 ml) at 20°–45° C. with stirring. The mixture was stirred for 1 hour at room temperature. Calcium hydroxide (9.3 g) was added to the aqueous solution and the mixture was refluxed for 21 hours with stirring followed by removal of ammonia under reduced pressure to give an aqueous solution of poly(calcium 2-carboxylatoethyl)-polyethyleneimine (65.9 g). The introduction rate of the acidic substituent was 23.6%.

EXAMPLE 24

To a mixture of polyethyleneimine(molecular weight: 10,000) (41 g) and sodium hydroxide (9.5 g) in water (165 ml) was added chloroacetic acid (22.5 g) under cooling in an ice bath and the mixture was stirred at 75° C. for 2 hours to give an aqueous solution of poly(carboxymethyl)polyethyleneimine (57.7 g). The introduction rate of the acidic substituent was 17.2%.

EXAMPLE 25

To a solution of PEI(molecular weight: 10,000) (40.0 g) in water (210 ml) was added portionwise phthalic anhydride (34.4 g) (¼ molar equivalent) over 1 hour with stirring at room temperature. The mixture was stirred for 61.5 hours at room temperature and sodium hydroxide (9.3 g) in water (30 ml) was added thereto to give an aqueous solution of poly(sodium 2-carboxylatobenzoyl)polyethyleneimine (79.5 g). The introduction rate of the acidic substituent was 20.0%.

EXAMPLE 26

To a solution of polyethyleneimine(molecular weight: 10,000) (46.9 g) in water (62.5 ml) was added dropwise acrylic acid (15.7 g) (1/5 molar equivalent) at 30°–40° C. with stirring. The mixture was stirred for 3 hours at 80° C. After cooling to room temperature the aqueous solution was diluted with water (31.2 ml). And ethylene oxide (31.2 g) (1/1.54 molar equivalent) was bubbled to the aqueous solution with stirring, keeping the temperature below 40° C. by occasional cooling, and the mixture was stirred for 2 hours at room temperature to give an aqueous solution of poly(2-carboxyethyl)-poly(2-hydroxyethyl)polyethyleneimine (93.8 g). The introduction rate of the acidic substituent was 15.4%.

EXAMPLE 27

To a solution of PEI(molecular weight: 10,000) (22.5 g) in water (63 ml) was added dropwise methacrylic acid (11.3 g) (¼ molar equivalent) at 25°–40° C. with stirring. The mixture was stirred for 3 days under reflux. After cooling to room temperature propylene oxide (18.2 g) (1/1.67 molar equivalent) was added dropwise to the aqueous solution with stirring, and the mixture was stirred for 5 hours to give an aqueous solution of poly(2-carboxypropyl)-poly(2-hydroxypropyl)polyethyleneimine (52.0 g). The introduction rate of the acidic substituent was 23.1%.

EXAMPLE 28

Poly(2-carboxypropyl)-poly(2-cyanoethyl)polyethyleneimine was prepared by reacting PEI(molecular weight: 10,000) with ¼ molar equivalent of methacrylic acid and 1/1.67 molar equivalent of acrylonitrile according to a similar manner to that of Example 27. The introduction rate of the acidic substituent was 31.3%.

EXAMPLE 29

Poly(2-carboxypropyl)-poly(2-hydroxypropyl)polyethyleneimine was prepared by reacting PEI(molecular weight: 10,000) with 1/6 molar equivalent of methacrylic acid and 1/1.46 molar equivalent of propylene oxide according to a similar manner to that of Example 27.

EXAMPLE 30

Poly(2-carboxypropyl)-poly(2-hydroxypropyl)-polyethyleneimine was prepared by reacting PEI(molecular weight: 10,000) with 1/5 molar equivalent of methacrylic acid and 1/1.54 molar equivalent of propylene oxide according to a similar manner to that of Example 27.

EXAMPLE 31

Poly(2-carboxyethyl)-poly(2-hydroxypropyl)polyethyleneimine (95.6 g) was prepared by reacting PEI(molecular weight: 10,000) (43.1 g) with 2/9 molar equivalent of acrylic acid (16.0 g) and 1/1.59 molar equivalent of propylene oxide (36.5 g) according to a similar manner to that of Example 26. The introduction rate of the acidic substituent was 21.9%.

EXAMPLE 32

Poly(2-carboxyethyl)-poly(2-hydroxyethyl)polyethyleneimine was prepared by reacting PEI(molecular weight 10,000) with 2/9 molar equivalent of acrylic acid and 1/1.59 molar equivalent of ethylene oxide according to a similar manner to that of Example 26. The introduction rate of the acidic substituent was 18.7%.

EXAMPLE 33

Poly(2-carboxyethyl)-poly(2-hydroxypropyl)polyethyleneimine was prepared by reacting PEI(molecular weight: 10,000) with 1/5 molar equivalent of acrylic acid and 1/1.54 molar equivalent of propylene oxide according to a similar manner to that of Example 26.

EXAMPLE 34

To a solution of PEI(molecular weight: 10,000) (49.4 g) in water (100 ml) was bubbled ethylene oxide (32.9 g) (1/1.54 molar equivalent) with stirring keeping the temperature 20°–40° C. by occasional cooling, and the mixture was stirred for 2 hours at room temperature. Acrylic acid (16.5 g) (1/5 molar equivalent) was added dropwise to the aqueous solution at 30°–40° C. with stirring, and the mixture was stirred for 3 hours at 80° C. to give an aqueous solution of poly(2-carboxyethyl)-poly(2-hydroxyethyl)polyethyleneimine (98.8 g). The introduction rate of the acidic substituent was 17.8%.

EXAMPLE 35

Poly(2-carboxyethyl)-poly(2-hydroxyethyl)polyethyleneimine was prepared by reacting PEI(molecular weight: 10,000) with 1/1.59 molar equivalent of ethylene oxide and 2/9 molar equivalent of acrylic acid according to a similar manner to that of Example 34. The introduction rate of the acidic substituent was 20.0%.

EXAMPLE 36

Poly(2-carboxyethyl)-poly(2-hydroxypropyl)polyethyleneimine was prepared by reacting PEI(molecular weight: 10,000) with 1/1.54 molar equivalent of propylene oxide and 1/5 molar equivalent of acrylic acid according to a similar manner to that of Example 34. The introduction rate of the acidic substituent was 19.2%.

EXAMPLE 37

Poly(2-carboxyethyl)-poly(2-hydroxypropyl)polyethyleneimine was prepared by reacting PEI(molecular weight: 10,000) with 1/1.93 molar equivalent of propylene oxide and ⅓ molar equivalent of acrylic acid according to a similar manner to that of Example 34.

EXAMPLE 38

To a solution of PEI(molecular weight: 10,000) (42.9 g) in water (50 ml) was added dropwise acrylamide (46.0 g) (1/1.54 molar equivalent) in water (53 ml) at 20°–45° C. with stirring. The mixture was stirred for 1 hour at room temperature to give an aqueous solution of poly(2-carbamoylethyl)polyethyleneimine. Acrylic acid (14.3 g) (1/5 molar equivalent) was added dropwise to the aqueous solution with stirring and the mixture was stirred for 3 hours at 80° C. to give an aqueous solution of poly(2-carboxyethyl)-poly(2-carbamoylethyl)polyethyleneimine (103.2 g). The introduction rate of the acidic substituent was 23.4%.

EXAMPLE 39

Poly(2-carboxyethyl)-poly(2-carbamoylethyl)polyethyleneimine was prepared by reacting PEI(molecular weight: 10,000) with 1/1.93 molar equivalent of acrylamide and ⅓ molar equivalent of acrylic acid according to a similar manner to that of Example 38. The introduction rate of the acidic substituent was 37.7%.

EXAMPLE 40

Poly(2-carboxyethyl)-poly(2-carbamoylethyl)polyethyleneimine (103.0 g) was prepared by reacting PEI(molecular weight: 10,000) (42.7 g) with 1/1.59 molar equivalent of acrylamide (44.3 g) and 2/9 molar equivalent of acrylic acid (16.0 g) according to a similar manner to that of Example 38. The introduction rate of the acidic substituent was 25.6%.

EXAMPLE 41

To a solution of PEI(molecular weight: 10,000) (45.2 g) in water (60.3 g) was added dropwise acrylic acid (15.1 g) (1/5 molar equivalent) at 30°–40° C. with stirring. The mixture was stirred for 3 hours at 80° C. After cooling to room temperature, the aqueous solution was diluted with water (36 ml). Acrylonitrile (36.2 g) (1/1.54 molar equivalent) was added dropwise to the aqueous solution with stirring and the mixture was stirred for 2 hours at room temperature to give an aqueous solution of poly(2-carboxyethyl)-poly(2-cyanoethyl)polyethyleneimine (96.5 g). The introduction rate of the acidic substituent was 32.4%.

EXAMPLE 42

To a solution of PEI(molecular weight: 10,000) (50.0 g) in water (100 ml) was added dropwise acrylonitrile (15.4 g) (⅓ molar equivalent) at 30°–40° C. with stirring. The mixture was stirred for 1 hour at room temperature. Ethylene oxide (1/1.67 molar equivalent) (30.7 g) was bubbled to the reaction product with stirring, keeping the temperature below 40° C. by occasional cooling, and the mixture was stirred for 1 hour at room temperature. To the reaction product was added sodium hydroxide (11.6 g) in water (140 ml) and the mixture was refluxed for 3 hours with stirring to give an aqueous solution of poly(sodium -carboxylatoethyl)-poly(2-hydroxyethyl)polyethyleneimine (108.0 g). The introduction rate of the acidic substituent was 15.6%.

EXAMPLE 43

Poly(sodium 2-carboxylatoethyl)poly(2-hydroxyethyl)polyethyleneimine was prepared by reacting PEI(molecular weight: 10,000) with ⅓ molar equivalent of acrylonitrile and 1/1.93 molar equivalent of ethylene oxide, successively, according to a similar manner to that of Example 42. The introduction rate of the acidic substituent was 24.9%.

EXAMPLE 44

Poly(sodium 2-carboxylatoethyl)poly(2-hydroxypropyl)polyethyleneimine was prepared by reacting PEI(molecular weight: 10,000) with ⅓ molar equivalent of acrylonitrile and 1/1.93 molar equivalent of propylene oxide, successively according to a similar manner to that of Example 42. The introduction rate of the acidic substituent was 26.5%.

EXAMPLE 45

To a solution of PEI(molecular weight: 10,000) (22.5 g) in water (63 ml) was added dropwise methacrylic acid (11.3 g) (¼ molar equivalent) at 25°–40° C. with stirring. The mixture was stirred for 3 days under reflux. After cooling to room temperature, acrylamide (22.3 g) (1/1.67 molar equivalent) was added portionwise to the aqueous solution with stirring, and the mixture was stirred for 1 week at room temperature to give an aqueous solution of poly(2-carboxypropyl)poly(2-carbamoylethyl)polyethyleneimine (56.1 g). The introduction rate of the acidic substituent was 26.0%.

EXAMPLE 46

To a solution of polyethyleneimine (molecular weight: 10,000) (27.8 g) in water (24 ml) was added dropwise maleic acid (7.5 g) (1/10 molar equivalent) in water (11.1 ml) [prepared from maleic anhydride (6.3 g) and water] at 30°–50° C. with stirring. The mixture was stirred for 10 hours under reflux. After cooling to room temperature, the aqueous solution was diluted with water (35.2 ml). And acrylamide (34.5 g) (1/1.33 molar equivalent) was added portionwise to the aqueous solution with stirring, and the mixture was stirred 25 hours at room temperature to give an aqueous solution of poly(1,2-dicarboxyethyl)-poly(2-carbamoylethyl)polyethyleneimine (69.8 g). The introduction rate of the acidic substituent was 8.6%.

EXAMPLE 47

To a solution of PEI(molecular weight: 10,000) (55.0 g) in water (100 ml) was bubbled ethylene oxide (29.1 g) (1/1.93 molar equivalent) with stirring keeping the temperature 30°–40° C. by occasional cooling, and the mixture was stirred for 1 hour at room temperature. Acrylonitrile (22.6 g) (¼ molar equivalent) was added dropwise to the aqueous solution with stirring at 33°–39° C. and the mixture was stirred for 1 hour at room temperature. To the reaction product was added sodium hydroxide (17.1 g) in water (100 ml) and the mixture was refluxed for 3 hours with stirring to give an aqueous solution of poly(sodium 2-carboxylatoethyl)-poly(2-hydroxyethyl)-polyethyleneimine (124.1 g). The introduction rate of the acidic substituent was 26.1%.

EXAMPLE 48

Poly(sodium 2-carboxylatoethyl)-poly(2-hydroxypropyl)polyethyleneimine was prepared by reacting PEI(molecular weight: 10,000) with 1/1.93 molar equivalent of propylene oxide and ⅓ molar equivalent of acrylonitrile, successively, according to a similar manner to that of Example 47. The introduction rate of the acidic substituent was 21.5%.

EXAMPLE 49

Poly(2-carboxypropyl)-poly(2-carbamoylethyl)-polyethyleneimine (47.9 g) was prepared by reacting PEI(molecular weight: 10,000) (19.4 g) with 2/11 molar equivalent of methacrylic acid (7.1 g) and 1/1.5 molar equivalent of acrylamide (21.4 g) according to a similar manner to that of Example 45. The introduction rate of the acidic substituent was 15.6%.

EXAMPLE 50

To a solution of PEI (molecular weight: 10,000) (17.8 g) in water (24.5 ml) was added portionwise itaconic acid (6.7 g) (1/8 molar equivalent) at 25°–40° C. with stirring. The mixture was stirred for 11 hours under reflux. After cooling to room temperature, the aqueous solution was diluted with water (20.3 ml). And acrylamide (21.3 g) (1/1.38 molar equivalent) was added portionwise to the aqueous solution with stirring, and the mixture was stirred for 1 week at room temperature to give an aqueous solution of poly(2,3-dicarboxypropyl)-poly(2-carbamoylethyl)polyethyleneimine (45.8 g). The introduction rate of the acidic substituent was 9.0%.

EXAMPLE 51

To a solution of PEI(molecular weight: 10,000) (43.6 g) in water (80 ml) was added dropwise acrylonitrile (34.9 g) (1/1.54 molar equivalent) at 30°–40° C. with stirring. The mixture was stirred for 1 hour at room temperature. After diluted with water (13 ml), acrylic acid (14.6 g) (1/5 molar equivalent) was added dropwise to the reaction product with stirring, and the mixture was stirred for 3 hours at 80° C. to give an aqueous solution of poly(2-carboxyethyl)-poly(2-cyanoethyl)-polyethyleneimine (93.1 g). The introduction rate of the acidic substituent was 31.1%.

What is claimed is:

1. Concrete admixture comprising polyethyleneimine compounds selected from the group consisting of
   (1) poly(dialkali metal dicarboxylatoalkyl)polyethyleneimine,
   (2) poly(dicarboxyalkyl)polyethyleneimine,
   (3) poly(alkali metal or alkaline earth metal carboxylatoalkyl)polyethyleneimine,
   (4) poly(alkali metal carboxylatoalkyl)poly(cyanoalkyl)polyethyleneimine,
   (5) poly(carboxyalkyl)polyethyleneimine,
   (6) poly(dialkali metal dicarboxylatohydroxyalkyl)polyethyleneimine,
   (7) poly(alkali metal carboxylatoaroyl)polyethyleneimine,
   (8) poly(carboxyalkyl)-poly(hydroxyalkyl)polyethyleneimine,
   (9) poly(carboxyalkyl)-poly(cyanoalkyl)polyethyleneimine,
   (10) poly(carboxyalkyl or dicarboxyalkyl)poly(carbamoylalkyl)polyethyleneimine and
   (11) poly(alkali metal carboxylatoalkyl)poly(hydroxyalkyl)polyethyleneimine.

2. Concrete admixture of claim 1 in which the polyethyleneimine compound is poly(1,2-dicarboxyethyl)-polyethyleneimine or salts thereof.

3. Concrete admixture of claim 1 in which the polyethyleneimine compound is poly(2,3-dicarboxypropyl)-polyethyleneimine or salts thereof.

4. Concrete admixture of claim 1, in which the polyethyleneimine compound is poly(2-carboxyethyl)polyethyleneimine or salts thereof.

5. Concrete admixture of claim 1, in which the polyethyleneimine compound is poly(2,3-dicarboxypropyl)-poly(2-carbamoylethyl)polyethyleneimine or salts thereof.

6. Concrete admixture of claim 1, in which the polyethyleneimine compound is poly(2-carboxyethyl)-poly(2-hydroxyethyl)polyethyleneimine or salts thereof.

7. Concrete admixture of claim 1, in which the polyethyleneimine compound is poly(2-carboxypropyl)-poly(2-hydroxyethyl)polyethyleneimine or salts thereof.

8. Concrete admixture of claim 1, in which the polyethyleneimine compound is poly(2-carboxyethyl)-poly(2-carbamoylethyl)polyethyleneimine or salts thereof.

* * * * *